United States Patent
Park

(10) Patent No.: US 10,372,090 B2
(45) Date of Patent: Aug. 6, 2019

(54) THREE-DIMENSIONAL (3D) BUILDING INFORMATION PROVIDING DEVICE AND METHOD

(71) Applicant: HANWHA TECHWIN CO., LTD., Seongnam-si (KR)

(72) Inventor: Jong Soo Park, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 863 days.

(21) Appl. No.: 14/264,196

(22) Filed: Apr. 29, 2014

(65) Prior Publication Data

US 2014/0325414 A1 Oct. 30, 2014

(30) Foreign Application Priority Data

Apr. 29, 2013 (KR) .................. 10-2013-0047594

(51) Int. Cl.
| | |
|---|---|
| *G06F 3/048* | (2013.01) |
| *G05B 15/02* | (2006.01) |
| *G06T 19/00* | (2011.01) |
| *G06F 3/0486* | (2013.01) |
| *H04L 12/28* | (2006.01) |

(52) U.S. Cl.
CPC .............. *G05B 15/02* (2013.01); *G06T 19/00* (2013.01); *G05B 2219/25011* (2013.01); *G06F 3/0486* (2013.01); *H04L 12/2816* (2013.01)

(58) Field of Classification Search
None
See application file for complete search history.

(56) References Cited

U.S. PATENT DOCUMENTS

| | | | | |
|---|---|---|---|---|
| 2003/0052877 A1* | 3/2003 | Schwegler, Jr. ..... | G06F 17/5004 | 345/420 |
| 2005/0002662 A1* | 1/2005 | Arpa ..................... | H04N 7/181 | 396/120 |
| 2005/0081161 A1* | 4/2005 | MacInnes ........... | G06F 17/5004 | 715/765 |
| 2007/0219645 A1* | 9/2007 | Thomas ................ | G05B 15/02 | 700/29 |
| 2008/0062167 A1* | 3/2008 | Boggs ................. | G06F 17/5004 | 345/419 |

(Continued)

FOREIGN PATENT DOCUMENTS

| | | |
|---|---|---|
| CN | 101939765 A | 1/2011 |
| KR | 10-2010-0089594 A | 8/2010 |

(Continued)

OTHER PUBLICATIONS

Communication dated Jan. 19, 2018, issued by the State Intellectual Property Office of P.R. China in counterpart Chinese application No. 201410178676.X.

(Continued)

*Primary Examiner* — William C Trapanese
(74) *Attorney, Agent, or Firm* — Sughrue Mion, PLLC

(57) ABSTRACT

Provided is a three-dimensional (3D) information providing device which reads values of sensors provided in equipment in a building, displays the sensor values on a 3D graphic monitoring screen, and controls the actual equipment in the building by using output values or control values of 3D device images corresponding to the equipment on the 3D graphic monitoring screen.

17 Claims, 22 Drawing Sheets

(56) References Cited

U.S. PATENT DOCUMENTS

| | | | |
|---|---|---|---|
| 2010/0315416 A1 | 12/2010 | Pretlove et al. | |
| 2011/0153279 A1* | 6/2011 | Zhang | G06F 17/5004 703/1 |
| 2012/0203806 A1 | 8/2012 | Panushev | |
| 2012/0296610 A1* | 11/2012 | Hailemariam | G06T 19/00 703/1 |

FOREIGN PATENT DOCUMENTS

| | | |
|---|---|---|
| KR | 10-2011-0068397 A | 6/2011 |
| KR | 10-2012-0121634 A | 11/2012 |
| KR | 10-2013-0016620 A | 2/2013 |

OTHER PUBLICATIONS

Communication dated Mar. 20, 2018, issued by the Korean Intellectual Property Office in counterpart Korean application No. 10-2013-0047594.

* cited by examiner

```
Property
            Point                          ifPropertyPoint
                                           ifPropertyPointGroup
            Animation
            Text
            Transform
Property
            SEARCH POINT
            POINT LIST                     ifPropertyList
            CONNECT POINT COMPONENT
            GENERATE POINT
            POINT INFORMATION              ifPropertyPointGroup
```

FIG. 7

| No | I/F-ID | URL | Method | Param |
|---|---|---|---|---|
| 01 | ifNew | /maqetta/cmd/createResource | GET | path:"./OperView/3D/project/newFile.html" |
| 02 | ifFileList | | | |
| 03 | ifOpen | /maqetta/user/maqettaUser/ws/workspace--/OperView/3D/project/file.html | GET | |
| 04 | ifSave | /maqetta/OperView/3D/project/file.html | PUT | fileSource |
| 05 | ifSaveAs | /maqetta/cmd/createResource<br>/maqetta/OperView/3D/project/saveAsFile.html | GET<br>PUT | path:"./OperView/3D/project/saveAsFile.html"<br>fileSource |
| 06 | ifComponentCategoryList | | | |
| 07 | ifComponentCategoryReg | | | |
| 08 | ifComponentCategoryDel | | | |
| 09 | ifComponentList | | | |
| 10 | ifComponentReg | | | |
| 11 | ifComponentDel | | | |
| 12 | ifPropertyPoint | /rest/bas/point/15 | GET | |
| 13 | ifPropertyPointGroup | /rest/bas/point/building/1/groups | GET | includesubgroups=true |
| 14 | ifPropertyList | | | |
| 15 | ifPropertyCmd | /rest/bas/point/652/setvalue | POST | value=on |
| 16 | ifPropertyState | /rest/bas/point/getvalues | POST | [PointStateReg] |

FIG. 8

```
Method : GET

Parameter : buildingId(Optional)

Response :

[{..
    "buildingId" : 346,..
    "parentPointGroupId" : null,..
    "buildingName" : "Building_BAS",..
    "Name" : "PointGroup1",..
    "id" : 386,..
    "description" : "",..
    "parentGroup" : null,..
    "uniquenodeid" : "PointGroup1_386",..
    "Type" : "PointGroup",..
}..
```

THREE-DIMENSIONAL (3D) BUILDING INFORMATION PROVIDING DEVICE AND METHOD

CROSS-REFERENCE RELATED APPLICATIONS

This application claims priority from Korean Patent Application No. 10-2013-0047594, filed on Apr. 29, 2013, in the Korean Intellectual Property Office, the disclosure of which is incorporated herein in its entirety by reference.

BACKGROUND

1. Field

Apparatuses consistent with one or more embodiments of the inventive concept relate to a building automation system (BAS), and more particularly, to an information providing device in a BAS

2. Description of the Related Art

One of most frequently used functions in building control software is a monitoring and controlling function through graphics.

In the past, in order to edit the graphics, various unique graphic editors were used, and their graphic editing functions were mostly to provide two-dimensional (2D) plane graphics. However, as building information modeling has recently been generally used even in ordinary buildings, three-dimensional (3D) graphics applied in building designs have been gradually increasing.

SUMMARY

In a building automation system (BAS), 3D information providing is required in order to automatically and efficiently control a building. One or more exemplary embodiments of the inventive concept provide a 3D information providing device satisfying this requirement.

Various aspects of the exemplary embodiments will be set forth in part in the description which follows and, in part, will be apparent from the description, or may be learned by practice of these embodiments.

According to an aspect of an exemplary embodiment, there is provided a 3D information providing device which provides 3D information of a building in a BAS. The device may include: a data communication unit configured to receive a value of a sensor provided for equipment in a premise; and a graphic unit configured to display a 3D device image of the equipment and the received value on a 3D screen, wherein the data communication unit is further configured to control the equipment by generating a control signal through the 3D device image.

According to an aspect of another exemplary embodiment, there is provided a 3D information providing device which may include: a graphic widget unit configured to generate a 3D graphic monitoring screen by dragging and dropping at least one 3D device image; a control point binding unit configured to bind at least one control point to the 3D device image on the screen; and a data communication unit configured to receive data collected from at least one sensor provided in at least one monitoring target object corresponding to the 3D device image a graphic widget unit configured to generate a 3D graphic monitoring screen by dragging and dropping at least one 3D device image; a control point binding unit configured to bind at least one control point to the 3D device image on the screen; and a data communication unit configured to receive data collected from at least one sensor provided in at least one monitoring target object corresponding to the 3D device image.

According to an aspect of still another exemplary embodiment, there is provided a 3D information providing method which may include: obtaining at least one 3D device image; generating a 3D graphic monitoring screen at a 3D information providing device by dragging and dropping the 3D device image; binding at least one control point corresponding to the 3D device image on the screen; and receiving and displaying on the screen data collected from at least one sensor provided in at least one monitoring target object corresponding to the 3D device image.

BRIEF DESCRIPTION OF THE DRAWINGS

These and/or other aspects will become apparent and more readily appreciated from the following description of the exemplary embodiments, taken in conjunction with the accompanying drawings, in which:

FIGS. 7 and 8 show examples of RESTful communications used in a 3D information providing device according to exemplary embodiments;

DETAILED DESCRIPTION OF THE EXEMPLARY EMBODIMENTS

Figure 1:
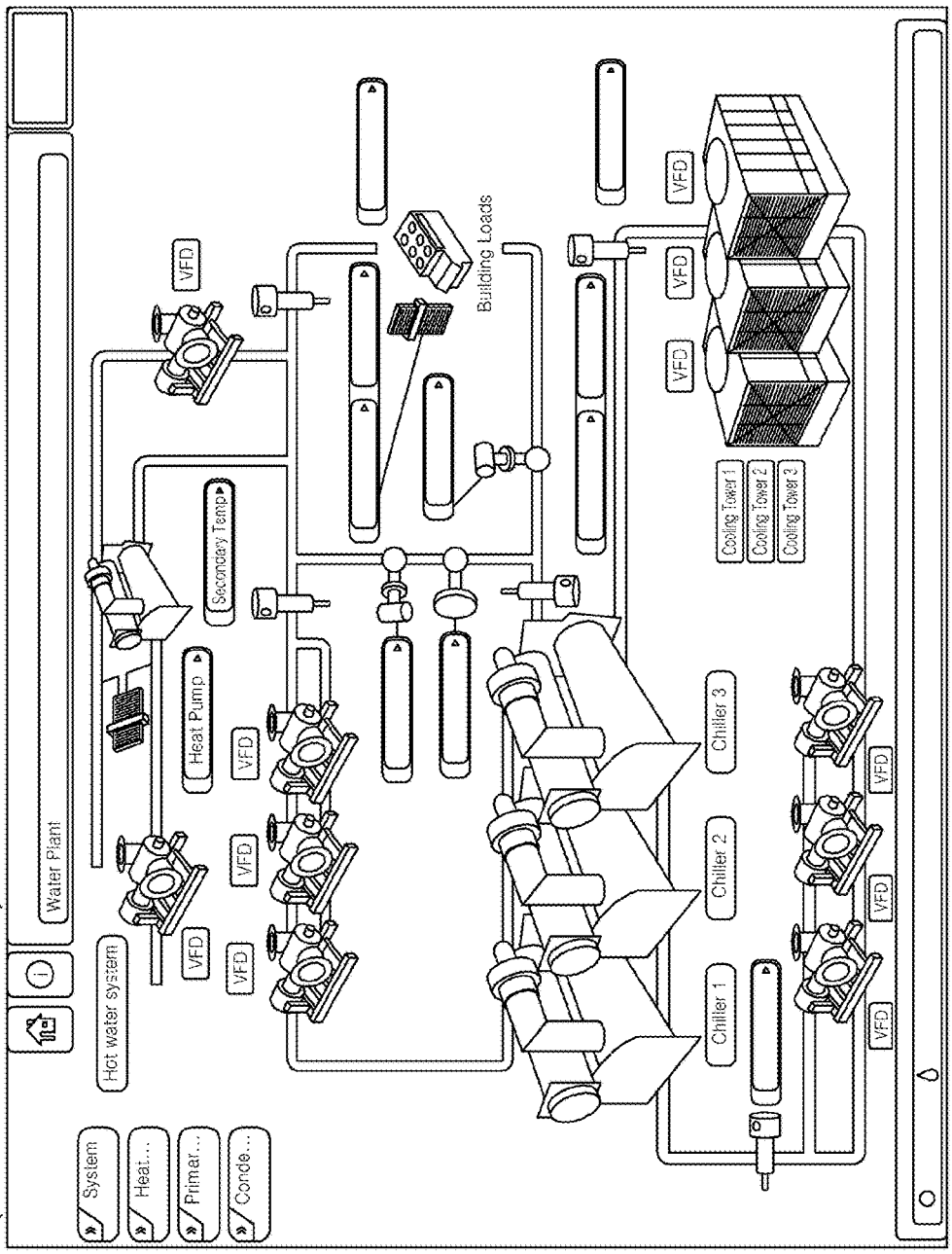
FIG. 1 is a diagram of a building control system according to the related art.

Reference will now be made in detail to exemplary embodiments which are illustrated in the accompanying drawings, wherein like reference numerals refer to like elements throughout. In this regard, these embodiments may have different forms and should not be construed as being limited to the descriptions set forth herein. Accordingly, the embodiments are merely described below, by referring to the figures, to explain various aspects of the inventive concept. As used herein, the term "and/or" includes any and all combinations of one or more of the associated listed items. Expressions such as "at least one of," when preceding a list of elements, modify the entire list of elements and do not modify the individual elements of the list.

A building automation system (BAS) is an automation system capable of providing a pleasant indoor environment for people and saving energy by using equipment for heating and air-conditioning, lighting, and power system in a building.

BAS equipment includes a variety of products in each level of the hierarchy of the BAS, from sensors to controllers, gateways, and monitoring units.

In order to monitor an equipment state of products provided when the building automation system was installed, an information providing apparatus for building automation control supporting a variety of functions including control, alerts, and history through graphics interfaces is required.

FIG. 1 is a diagram of a building control system according to the related art.

In the building control system or building control software according to the related art, graphics are expressed in a two-dimensional (2D) or two and a half dimensional (2.5D) space. As a result, as shown in FIG. 1, a cubic effect is superficially provided but it is impossible to magnify, reduce, rotate, and translate each object in the graphics.

Figure 2:
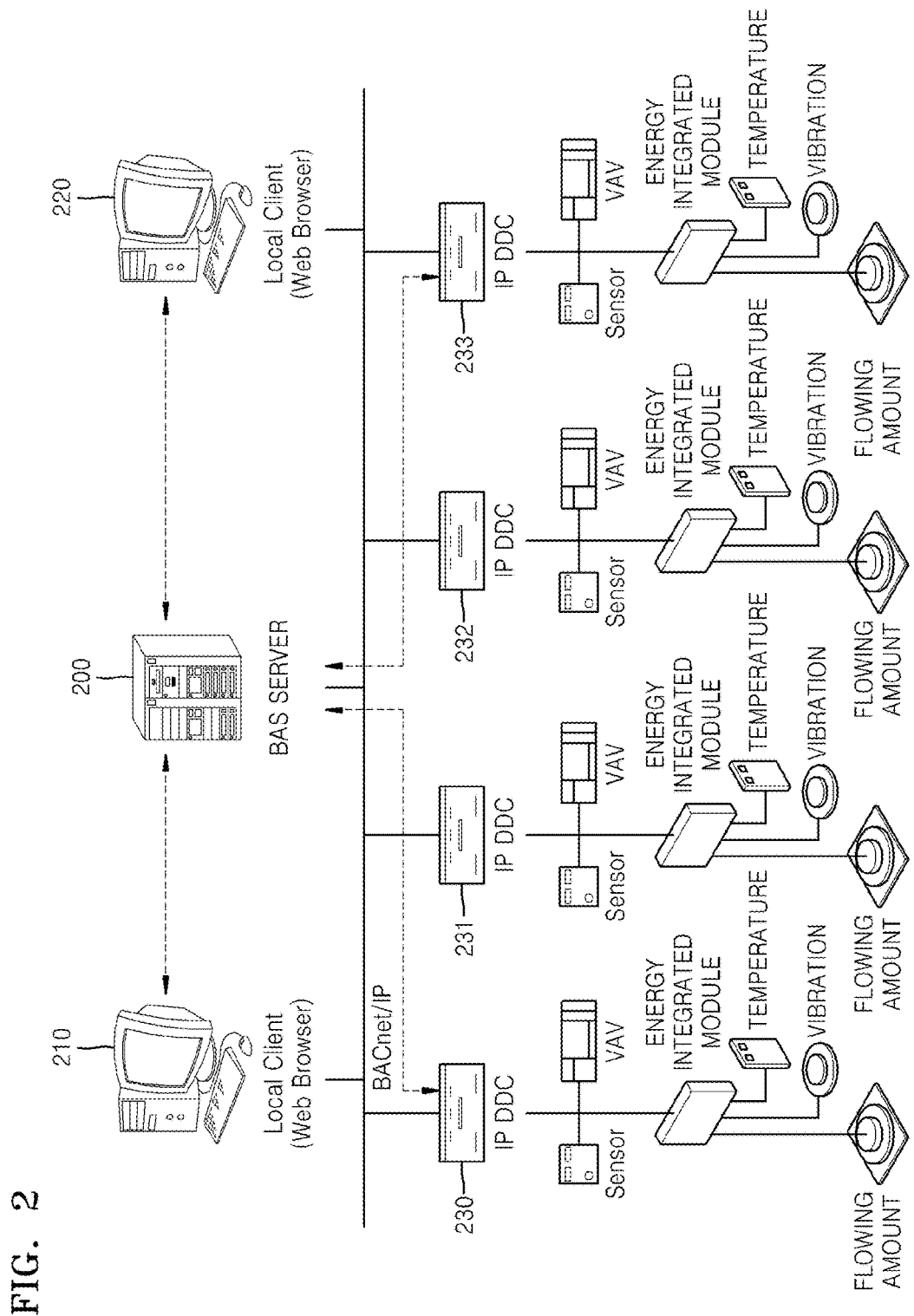
FIG. 2 illustrates that a 3D information providing device receives data for maintaining and repairing of monitoring target objects such as building equipment, according to an exemplary embodiment.

FIG. 2 illustrates that a three-dimensional (3D) information providing device receives data for maintaining and repairing of monitoring target objects such as building equipment, according to an exemplary embodiment.

The 3D information providing device may be implemented in such devices as a computer, a notebook computer, a hand-held device, a smartphone and a tablet computer.

Figures 5, 6:
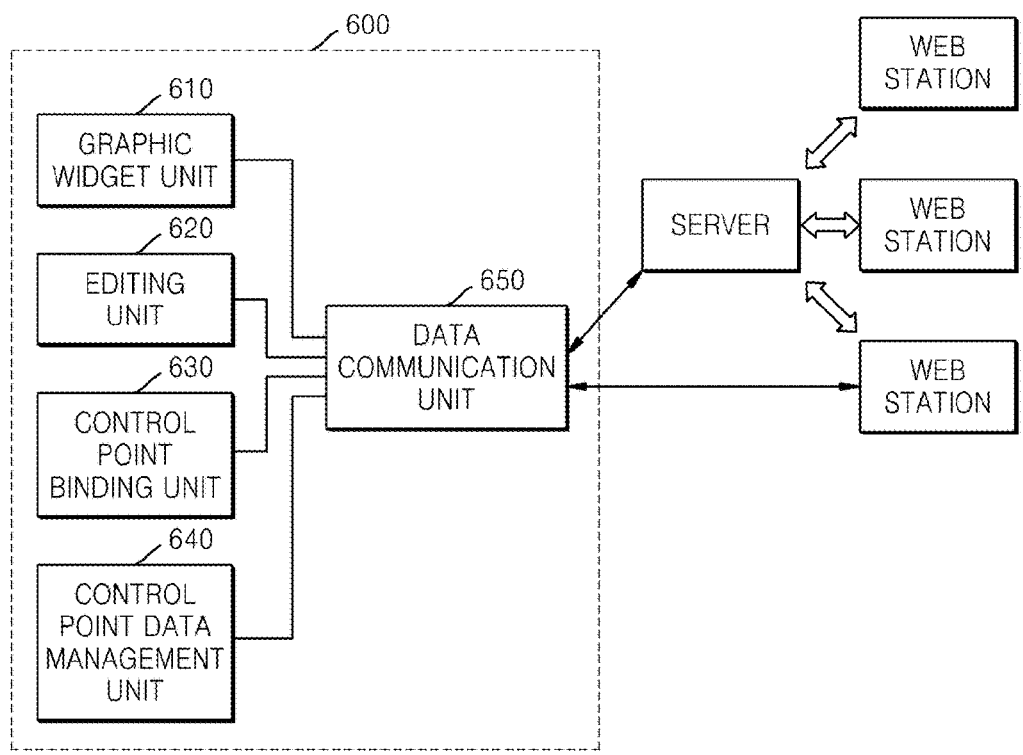
FIG. 5 shows an example of a 3D information providing device providing control point information according to an exemplary embodiment.
FIG. 6 shows an internal structure of a 3D information providing device according to an exemplary embodiment.

The 3D information providing devices 210 and 220 may be implemented such that the devices 210 and 220 automatically and remotely calculate data collected from at least one or more sensors provided in at least one monitoring target object in a BAS environment, or receive data automatically calculated in a BAS server 200 in order to provide the data to a 3D graphic monitoring screen of the 3D information providing device 210 and 220. The 3D information providing device 210 and 220 may be configured to output control signals for controlling the monitoring target object by using at least one 3D device image corresponding to the monitoring target object on the 3D graphic monitoring screen. As described later in reference to FIG. 6, the 3D information providing device 210 and 220 may calculate the data collected from the sensors and control the monitoring target object through a data communication unit 650 having an overall control function as illustrated in FIG. 6.

Examples of monitoring target object are an electric wiring system, water pipes, a cooling and heating system, a gas pipe system, an air-conditioning system, a boiler system, a temperature system, a power system, and/or a ventilation system in each floor of a building. Controllers 230 through 233 collect data from sensors provided in the monitoring target object. Then, the controllers 230 through 232 transmit the collected data to the BAS server 200.

In the BAS server 200, energy consumptions, operation performances, and history information for maintenance and repair for each energy consuming apparatus are analyzed and stored based on the collected data.

For example, in the BAS server 200, items such as heat source, power, and hot water may be classified, and each of these items may be further divided into sub-items for management such as, "heat source: heat source main body, sample power," "power: ventilation, water supply and drain, lift," and "hot water: heat source main body."

Also, each sub-item may be divided into energy consumption apparatuses for management such as "heat main body: freezer, cold and hot water, boiler, temperature and moisture controlling apparatus, etc.," "sample power: cooling water pump, cooling tower, cold and hot water first pump, etc.," "ventilation: parking lot fan, ventilation fan, etc.," "water supply and drain: water lift pump, etc.," and "lift: elevator, escalator, etc."

The BAS server 200 may be implemented to store and manage corresponding relations between a plurality of sensors and a monitoring target object or an energy consuming apparatus including the plurality of sensors in a building as described above.

In the BAS server 200, 3D graphic related data such as 3D component files, 3D graphic files, and camera viewpoint storing files, may be stored and may be provided to the 3D information providing devices 210 and 220.

The BAS server 200 may also be implemented such that when 3D graphic related data is modified in the 3D information providing devices 210 and 220, the modified data from the 3D information providing devices 210 and 220 is received and the 3D graphic related data stored in the BAS server 200 may be modified and updated.

Also, the BAS server 200 may be implemented such that data from the 3D information providing devices 210 and 220 is received in the BAS server 200 and, based on the received data, operations of apparatuses in the building can be adjusted remotely.

Figure 3:
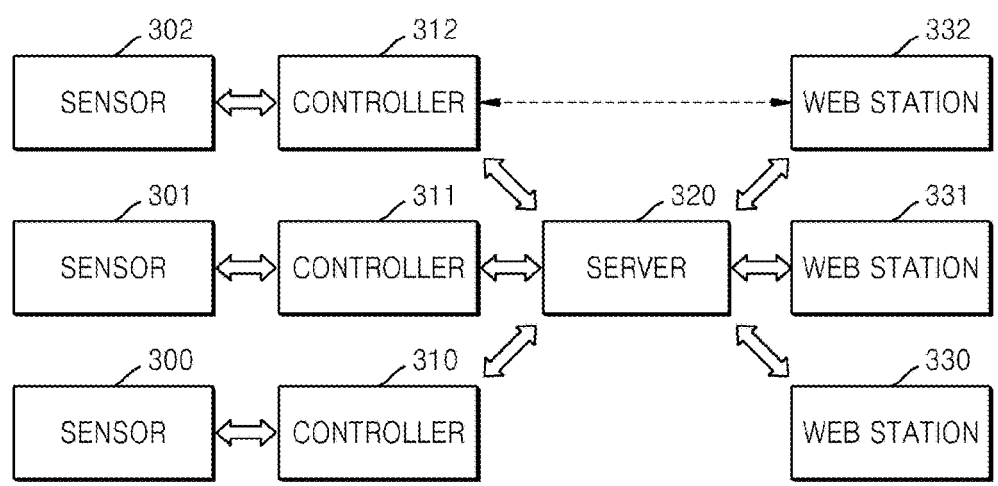
FIG. 3 is a schematic diagram showing a structure in which a 3D information providing device receives data for maintaining and repairing of monitoring target objects such as building equipment, according to an exemplary embodiment.

FIG. 3 is a schematic diagram showing a structure in which a 3D information providing device receives data for maintaining and repairing of monitoring target objects such as building equipment, according to an exemplary embodiment.

As illustrated in FIG. 3, data is collected from the sensors 300 through 302 provided in corresponding monitoring target objects in a building, and through the controllers 310 through 312 and the server 320, the data is provided to the 3D information providing devices 330 through 332 in the form of 3D graphic images.

Figure 4:
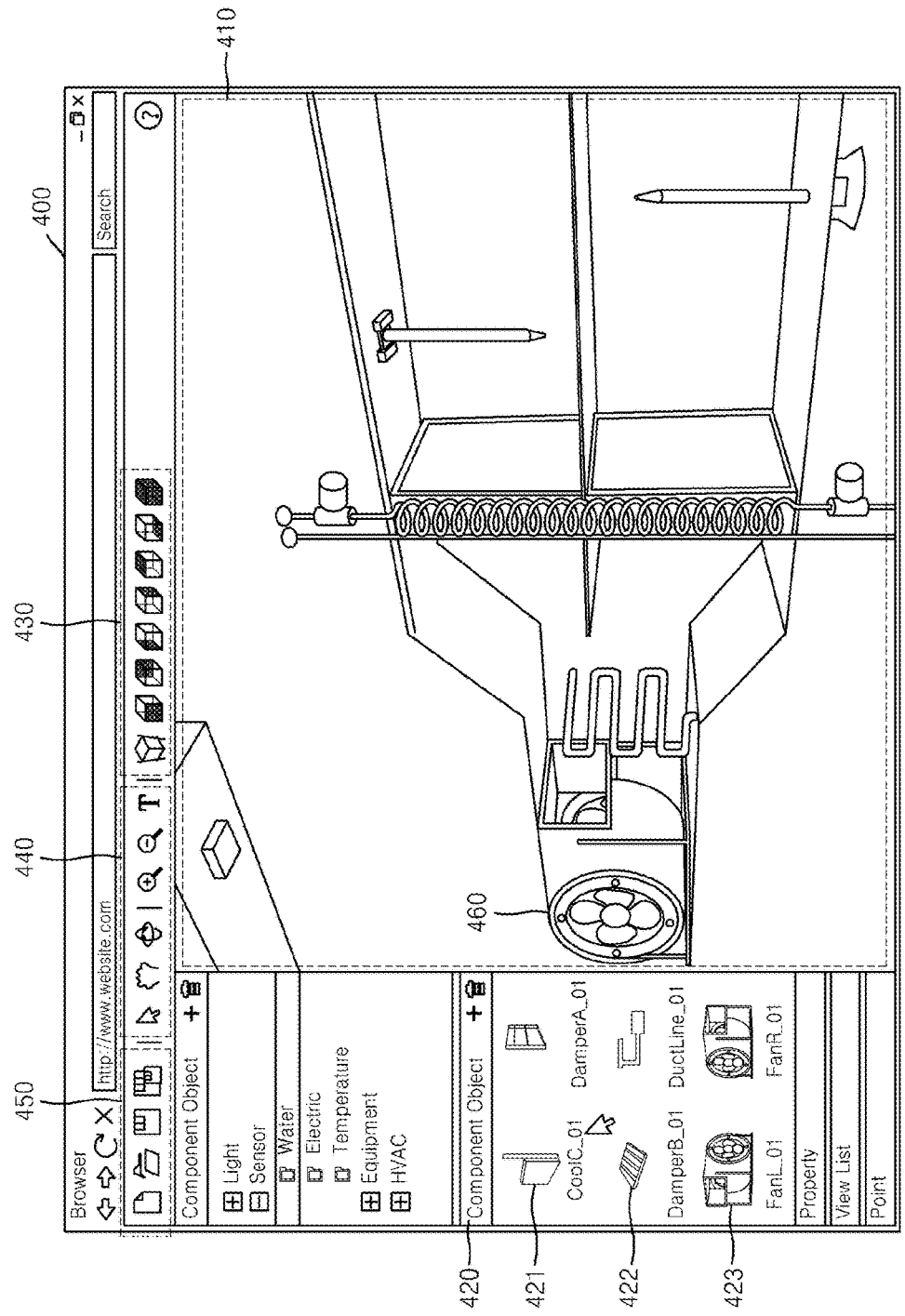
FIG. 4 shows an example of an implementation of a 3D information providing device according to an exemplary embodiment.

FIG. 4 shows an example of an implementation of a 3D information providing device according to an exemplary embodiment in which the 3D information providing device provides interfaces for providing building information and controlling a building in 3D graphic images.

The 3D information providing device 400 may be implemented as a device such as a computer, a notebook computer, a hand-held device, a smartphone, and a tablet computer, and may be configured to install software, a web browser, or an application to provide the interfaces for providing building information and controlling the building therein.

The 3D information providing device 400 may be implemented to generate a 3D graphic monitoring screen 410 by dragging and dropping at least one or more 3D device images 421 through 423.

The 3D information providing device 400 provides a 3D device list 420 indicating each piece of equipment or each energy consuming apparatus provided in a building. Also, by listing a variety of graphic symbols, a component editing function is provided to utilize the list when a graphic file to be used in an actual place is prepared.

Also, a registration function for registering actual control points is provided in order to enable display and control of real-time data of actual equipment on a currently prepared graphic image. In order to display an actual control point, a data collection procedure as in FIGS. 2 and 3 is required. For this, in an exemplary embodiment of the present invention, a representational state transfer (RESTful) communication as in FIGS. 7 and 8 is used.

Then, a user may generate a 3D graphic monitoring screen 410 by selecting in the 3D device list 420 and dragging and dropping at least one of device images 421 through 423 corresponding to devices provided in each floor of the building.

In this case, functions of rotation, magnification, reduction, and translation of each of the 3D device images are provided. In the 3D information providing device 400, a variety of image editing functions 430 and 440, including rotation, magnification, reduction, and translation, may be provided. It should be understood that the image editing functions are not limited to only the above-listed exemplary functions.

Also, according to an exemplary embodiment, images generated after editing such as rotation, magnification, reduction and translation are stored according to each viewpoint.

For example, if a user rotates an image of a cooler 180°, the 180°-rotated image can be stored and if the user rotates an image of a cooler 360°, the 360°-rotated image can be stored.

According to an exemplary embodiment, the 3D information providing device 400 may bind at least one or more of control points to a 3D device image.

For example, three control points may be bound to a cooler 460 such that a first control point is bound to temperature of an external cooler provided on the ground floor, a second control point is bound to moisture of the external cooler, and a third control point is bound to $CO_2$ density of the external cooler.

The first through third control points may be implemented to receive data values transmitted by a sensor provided in the vicinity of the cooler 460 or in the cooler 460 itself on the ground floor, and display the received data in the 3D monitoring screen.

For example, the three control points together with the 3D device indication of the cooler 460 may be displayed. Also, analog or digital data provided from the BAS server (shown in FIG. 2) may be received and displayed in the 3D graphic monitoring screen. Through the 3D graphic monitoring screen, the cooler 460 and other apparatuses in operation in the building may be controlled for operations.

For example, a cooler in the building may be turned off by remotely turning off the cooler in the 3D graphic monitoring screen 410.

According to an exemplary embodiment as shown in FIG. 5, control point information may be provided from a 3D information providing device.

In the 3D information providing device, attributes of each control point or information on each control point may be managed.

The whole control point list information, control point information corresponding to each apparatus, or each piece of equipment or energy equipment in a building, 3D device information corresponding to each control point, and link information between data collected from at least one or more sensors and the at least one or more control points corresponding to the sensors may be collected and managed.

FIG. 6 shows an internal structure of a 3D information providing device according to an exemplary embodiment.

The 3D information providing device 600 includes a graphic widget unit 10, an editing unit 620, a control point binding unit 630, a control point data management unit 640 and a data communication unit 650.

The graphic widget unit 610 is configured to drag and drop at least one or more 3D device images to generate a 3D graphic monitoring screen. At least one or more 3D device images may be provided by the BAS server 200 or may be prepared in the graphic widget unit 610 beforehand.

The editing unit 620 supports an image editing function including rotation, magnification, reduction, translation, and storing of the at least one or more 3D device images forming the 3D graphic monitoring screen generated by the graphic widget unit 610.

The control point binding unit 630 binds at least one or more control points with at least one of the 3D device images. That is, the control point binding unit 630 binds at least one or more control points to at least one 3D device image in the 3D monitoring screen corresponding to at least one piece of equipment or energy apparatus in the building, respectively. Each control point receives information of at least one sensor provided in each piece of equipment or each energy apparatus of the building and displays corresponding data.

In this case, the data communication unit 650 receives data collected from the at least one or more sensors provided in each piece of equipment or each energy apparatus in the building corresponding to the 3D device images, in a RESTful communication method. Also, a signal input on the 3D device image by a user is transmitted to the BAS server, each piece of equipment or each energy apparatus or its controllers such as the controllers 230 through 233 in FIG. 2, in the RESTful communication method. Through this, the user may control the 3D device images in the 3D monitoring screen to control actual equipment and energy apparatuses in the building, such as a damper, a fan, an air-conditioner.

The data communication unit 650 may be configured to receive sensor data from the BAS server 200 or the controllers 230 through 233 in FIG. 2 and/or to transmit the sensor data in the RESTful communication method. An example of the RESTful communication method is shown in FIGS. 7 and 8. The data communication unit 650 may also perform an overall control function in the 3D information providing device 600.

The control point data management unit 640 stores, modifies, and manages list information of the at least one or more of the control points, link information between data collected from the at least one or more sensors and at least one or more control points corresponding to the sensors, and 3D device information corresponding to each control point. Also, the control point data management unit 640 may be configured to display this information on the 3D graphic monitoring screen.

Figure 9:
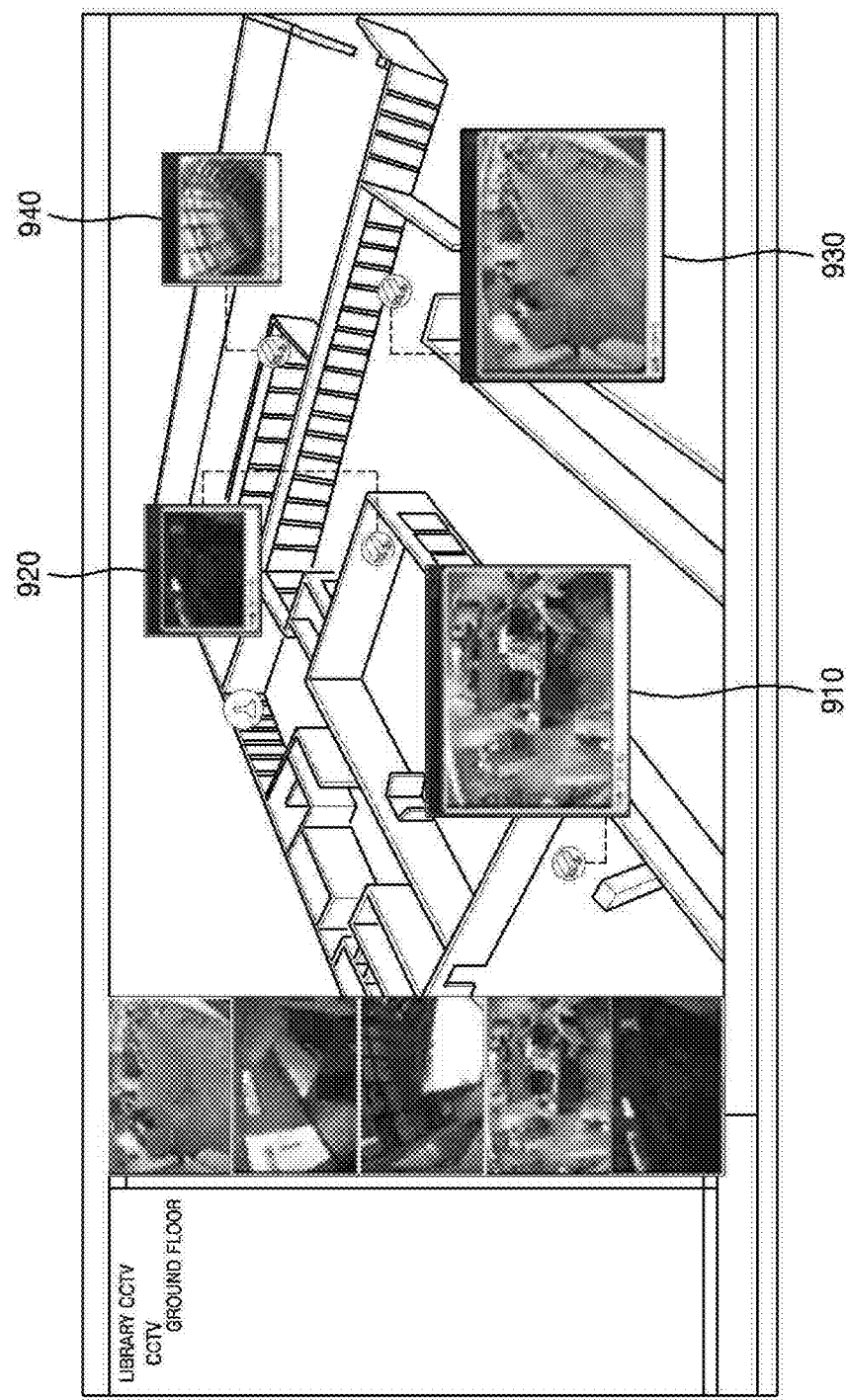
FIGS. 9 and 10 illustrate that a 3D information providing device according to an exemplary embodiment.
Figure 10:
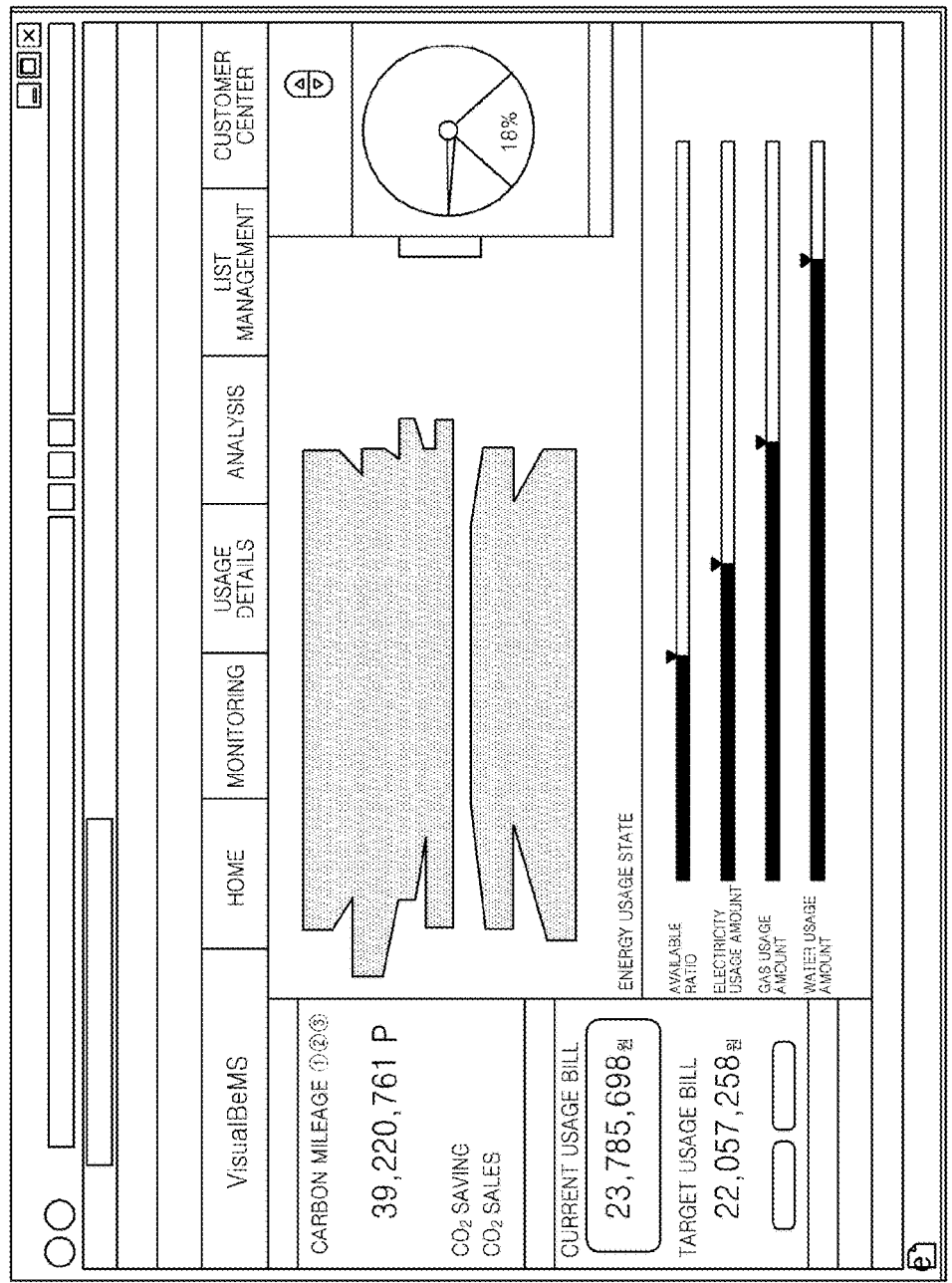

FIGS. 9 and 10 illustrate that a 3D information providing device according to an exemplary embodiment.

According to the present exemplary embodiment, the 3D information providing device may be configured to add security monitoring function in a building by adding video clips 910 through 940 on a 3D graphic monitoring screen as shown in FIG. 9 in addition to providing information for building automation control.

Also, as shown in in FIG. 10, the 3D information providing device may be configured to provide an editing function for editing energy consumption amounts in each floor or in each area of each floor in order to analyze energy used in a building.

Figure 11A:
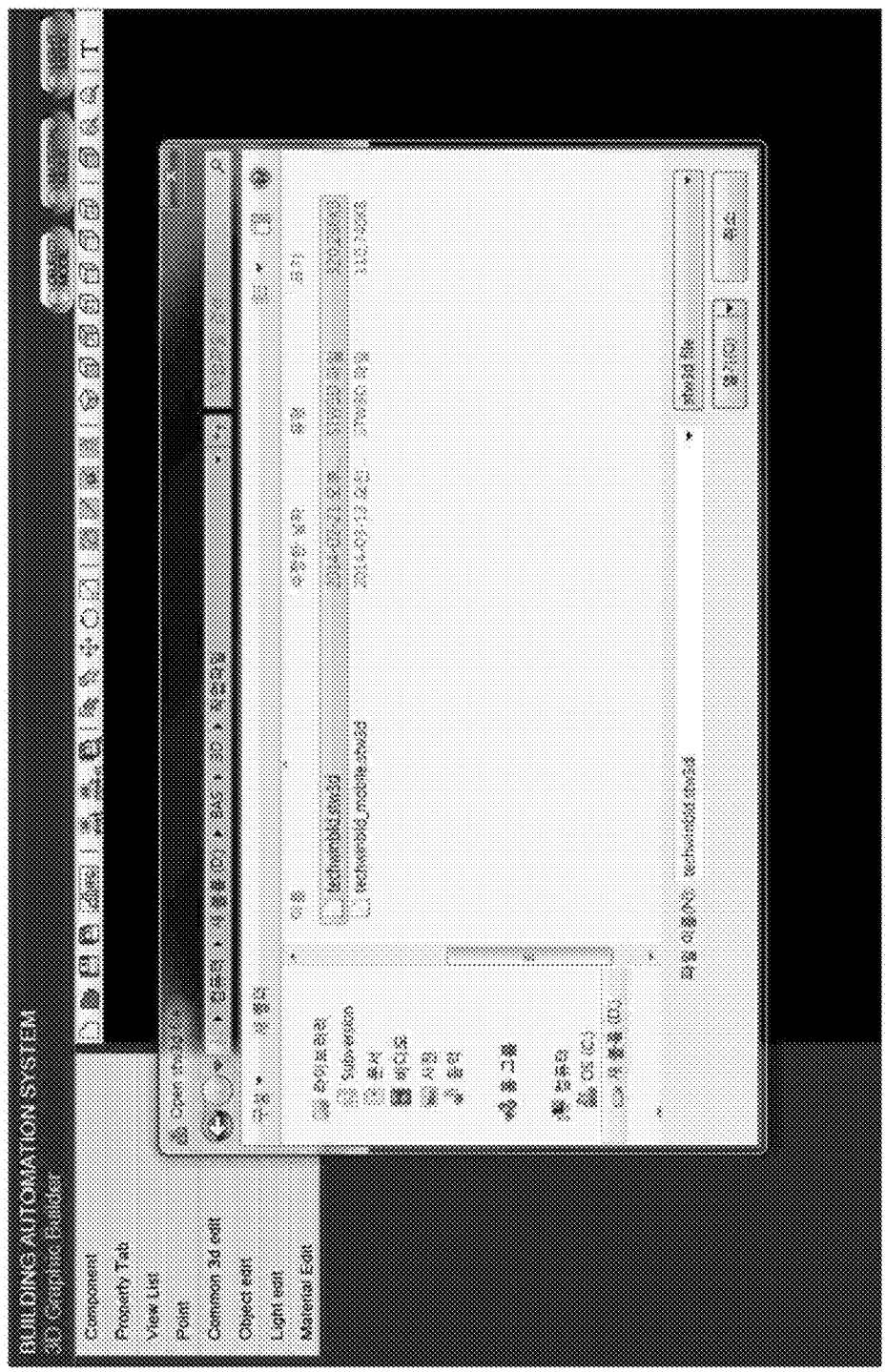
FIGS. 11A and 11B illustrate that a design drawing complying with Industry Foundation Class (IFC) standards is converted and displayed in a 3D information providing device, according to an exemplary embodiment.
Figure 11B:
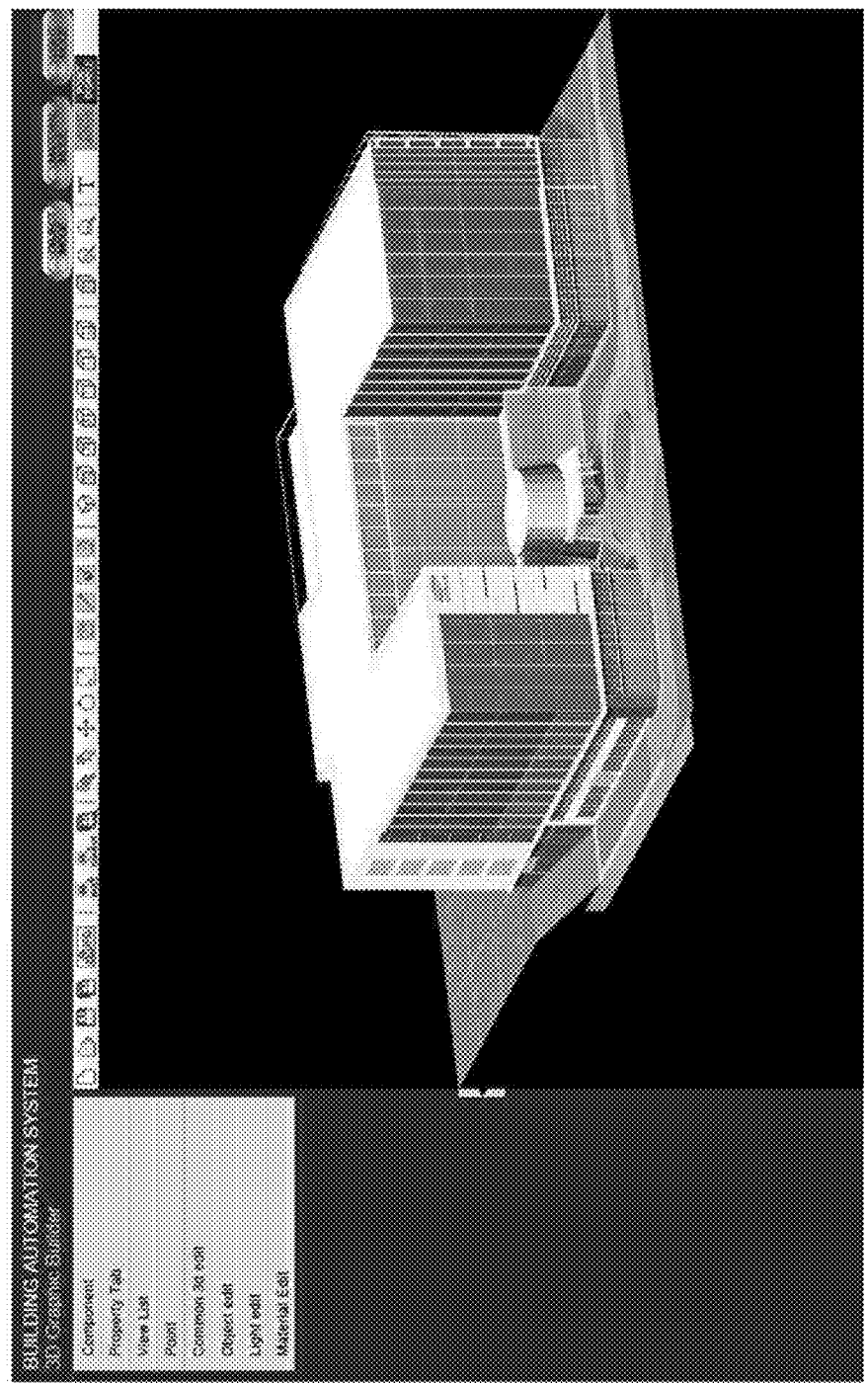

FIGS. 11A and 11B illustrate that a design drawing complying with Industry Foundation Classes (IFC) standards is converted and displayed in a 3D information providing device according to an exemplary embodiment.

In the present exemplary embodiment, a design drawing complying with the IFC standards is 3D-converted. FIG. 11B shows an embodiment of a 3D-converted drawing. Then, a 3D device image may be obtained based on building information management (BIM) information which can be obtained from the 3D-converted design drawing.

Figure 12:
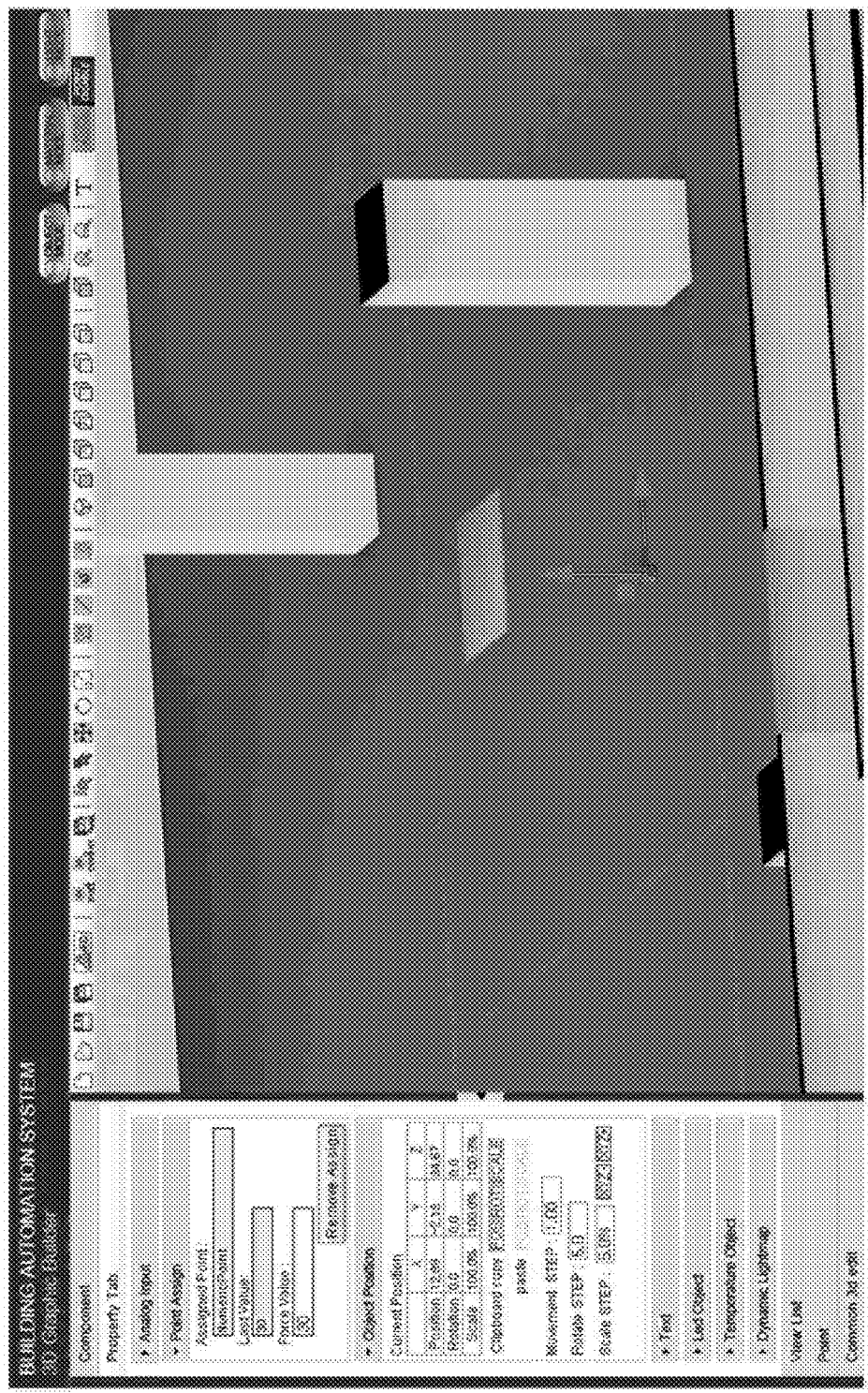
FIGS. 12 through 14 illustrate that in an editing unit of a 3D information providing device 3D translation, rotation, and size-adjustment of an object are performed, according to exemplary embodiments.
Figure 13:
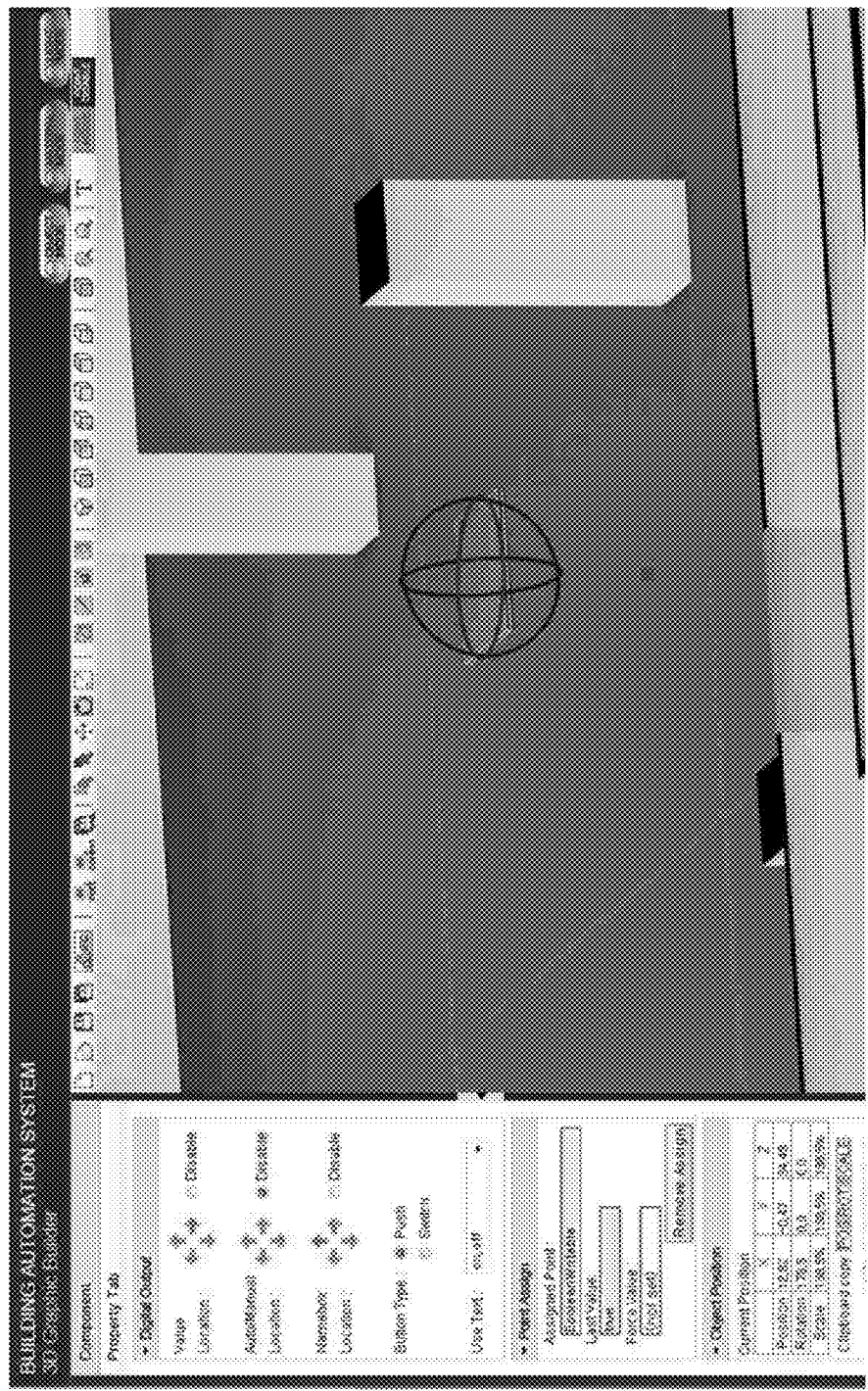
Figure 14:
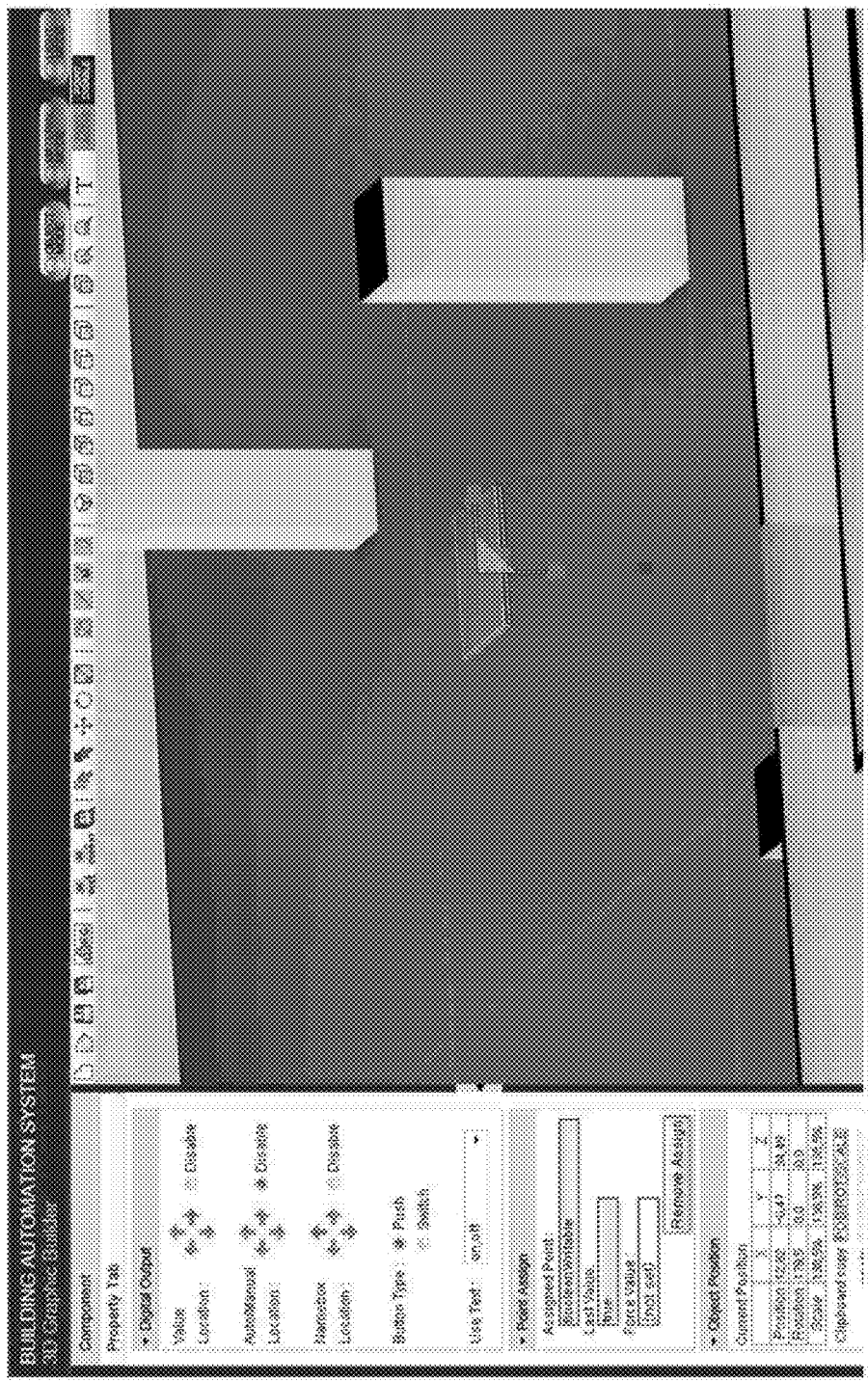

FIGS. 12 through 14 illustrate that in the editing unit 620 of the 3D information providing device 600 of FIG. 6, 3D translation, rotation, and size-adjustment of an object, e.g., a 3D device image, are performed, according to an exemplary embodiment.

According to this exemplary embodiment, the 3D information providing device 600 may perform translation, rotation and size-adjustment of a 3D device image obtained based on the BIM information that can be obtained from the 3D-converted design drawing, or a 3D device image which is received by the data communication unit 650 through communication, a 3D device image which is provided by the 3D information providing device 600 itself as illustrated in FIG. 4. In this case, each object can be translated, rotated, and size-adjusted in x, y, and z directions.

Figure 15:
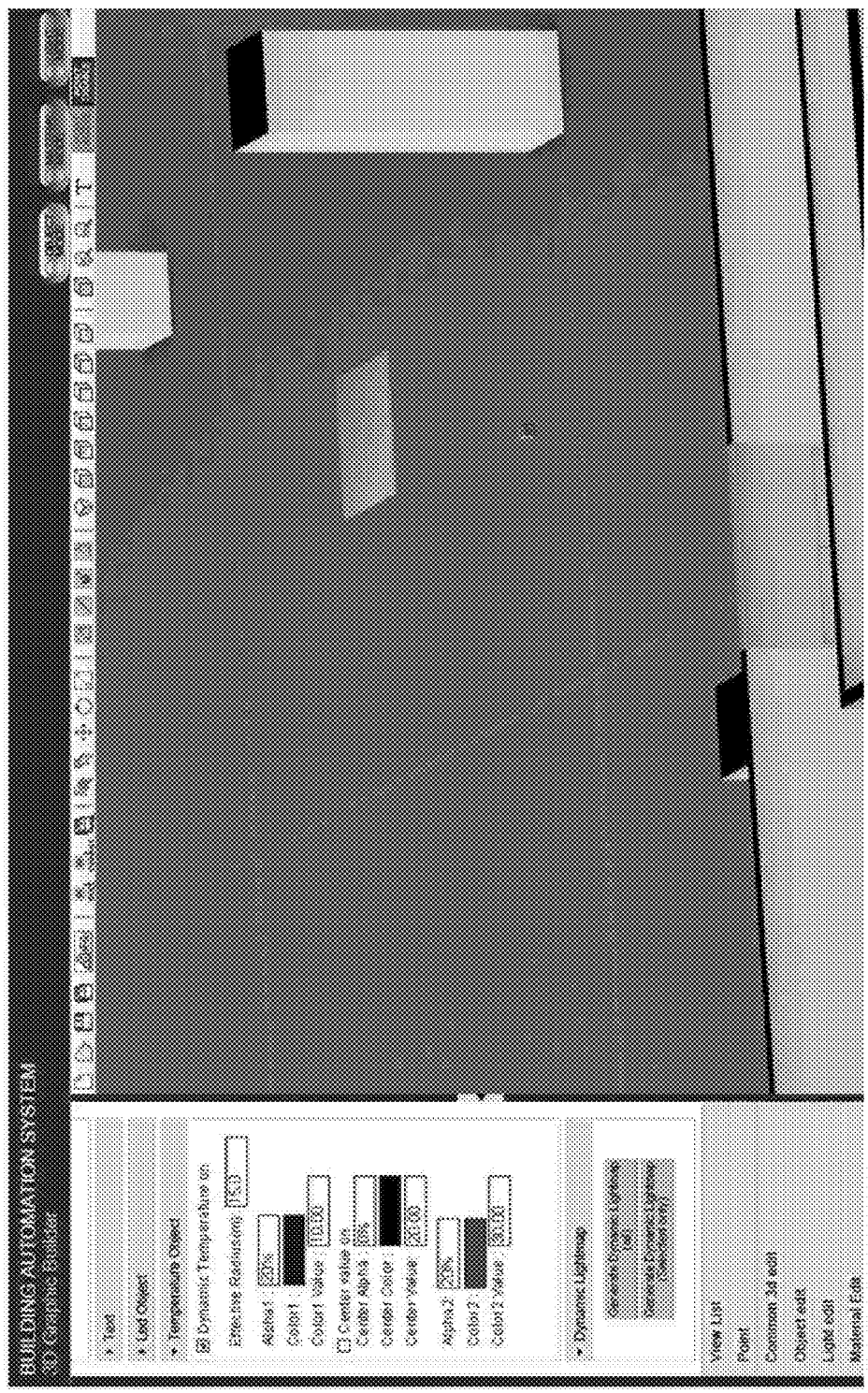
FIGS. 15 and 16 illustrate that in an editing unit of a 3D information providing device setting and calculation of temperature display are performed, according to exemplary embodiments.
Figure 16:
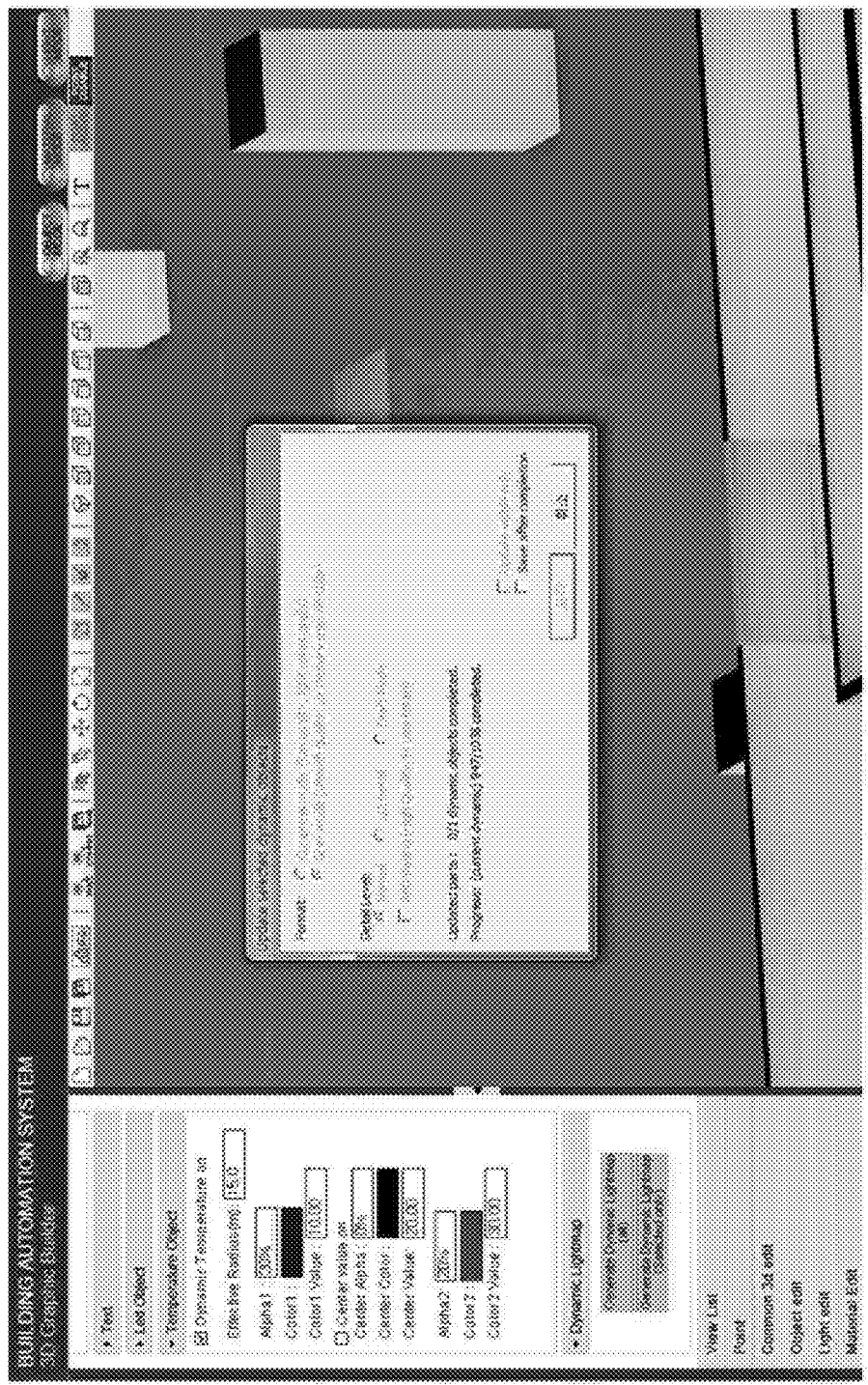

FIGS. 15 and 16 illustrate that the editing unit 620 of the 3D information providing device 600 of FIG. 6 sets and calculates temperature display.

According to this exemplary embodiment, the 3D information providing device 600 displays a temperature state with colors according to values sensed in each of monitoring target objects or in a predetermined area. FIG. 16 illustrates an example of calculating an area for displaying a temperature according to temperature display setting in the 3D information providing device 600.

Also, according to an exemplary embodiment, the 3D information providing device 600 may be configured to display at least one or more of temperatures of predetermined monitoring target objects, and temperature changes thereof by using one or more 3D devices corresponding to the monitoring target objects in a BAS environment.

Figure 17:
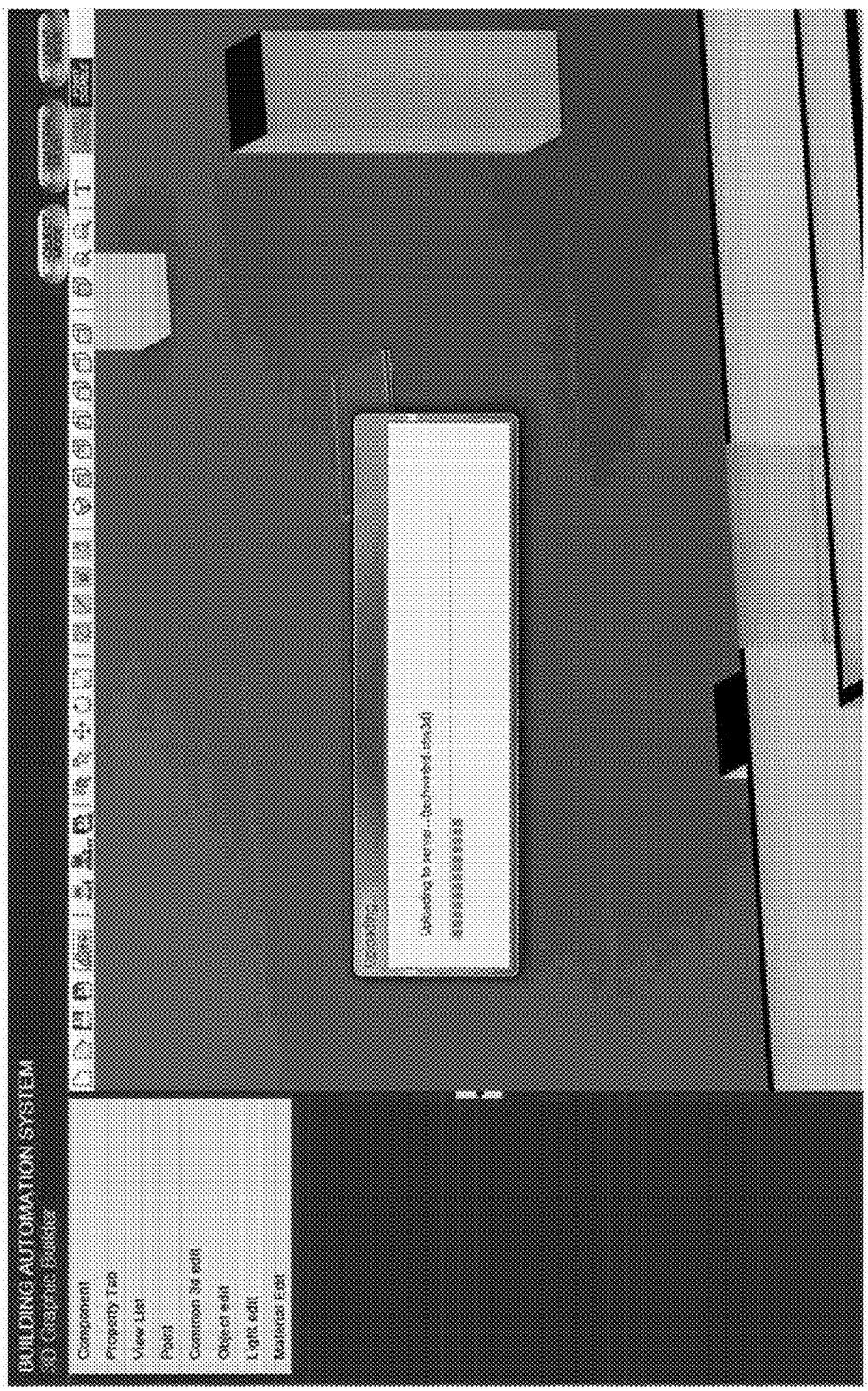
FIG. 17 illustrates that a 3D graphic monitoring screen completed in a 3D information providing device is transmitted to a server, according to an exemplary embodiment.

FIG. 17 illustrates that a 3D graphic monitoring screen completed in the 3D information providing device 600 according to an exemplary embodiment is transmitted to the BAS server 200.

According to this exemplary embodiment, the 3D information providing device 600 may transmit a 3D graphic monitoring screen file to an external server through the data communication unit 650 if the 3D graphic monitoring screen corresponding to a monitoring target object is completed. If the 3D graphic monitoring screen file is transmitted to the external server, a user can see the 3D graphic monitoring screen provided by the 3D information providing device 600 of the present embodiment through a viewer such as the World Wide Web and its equivalents.

Figure 18A:
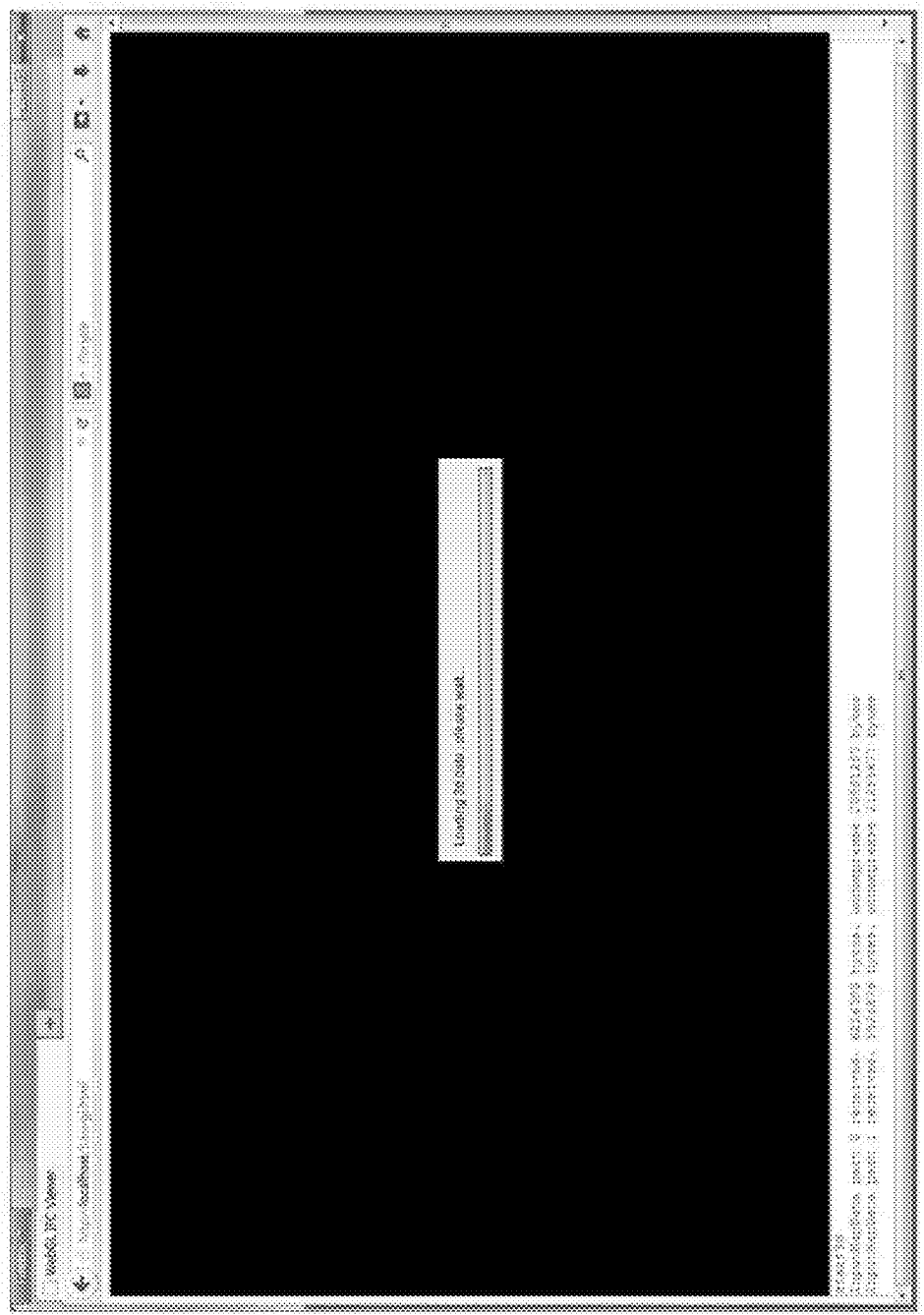
FIGS. 18A and 18B illustrate a viewer of a 3D information providing apparatus, according to exemplary embodiments.
Figure 18B:

FIGS. 18A and 18B illustrate a viewer of the 3D information providing apparatus 600 according to an exemplary embodiment. The viewer may be implemented in a variety of apparatuses having a display such as a computer, a hand-held device, a smartphone, a mobile phone, a tablet PC, and a notebook computer. Also, the viewer may be implemented in the form of a web page or an application and may be shown on a display.

FIG. 18A illustrates an example of fetching a 3D graphic monitoring screen file, and FIG. 18B illustrates that a 3D graphic monitoring screen file is shown on a display after loading the file. The viewer (shown in FIG. 18B) may display a variety of screens about the whole bird's eye view of at least one monitoring target objector equipment, equipment in each floor, and lighting of a predetermined space (for example, lighting in a restaurant).

Figure 19:
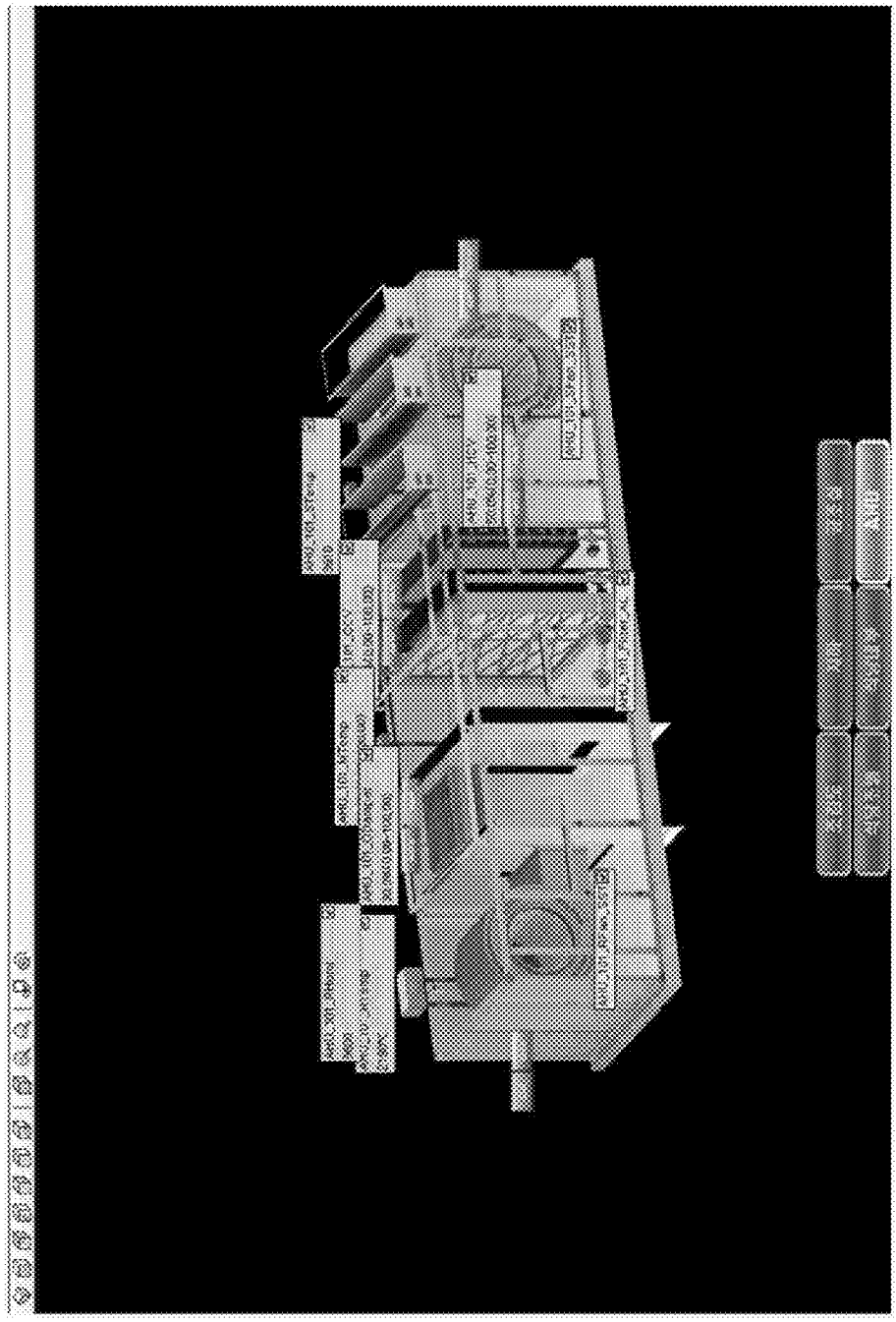
FIG. 19 illustrates that in a viewer of a 3D information providing device bound control points are monitored, according to an exemplary embodiment.

FIG. 19 illustrates that in a viewer of the 3D information providing device 600, bound control points are monitored, according to an exemplary embodiment.

Figure 20:
FIG. 20 illustrates that in a viewer of a 3D information providing device a point is controlled, according to an exemplary embodiment.

According to this exemplary embodiment, the viewer of the 3D information providing device 600 supports an interface capable of monitoring and controlling at least one monitoring target object or equipment. FIG. 19 illustrates an example of monitoring an air-conditioner in the viewer. FIG. 20 illustrates an example of controlling a point inside a restaurant from the first-person viewpoint in the viewer.

Figure 21:
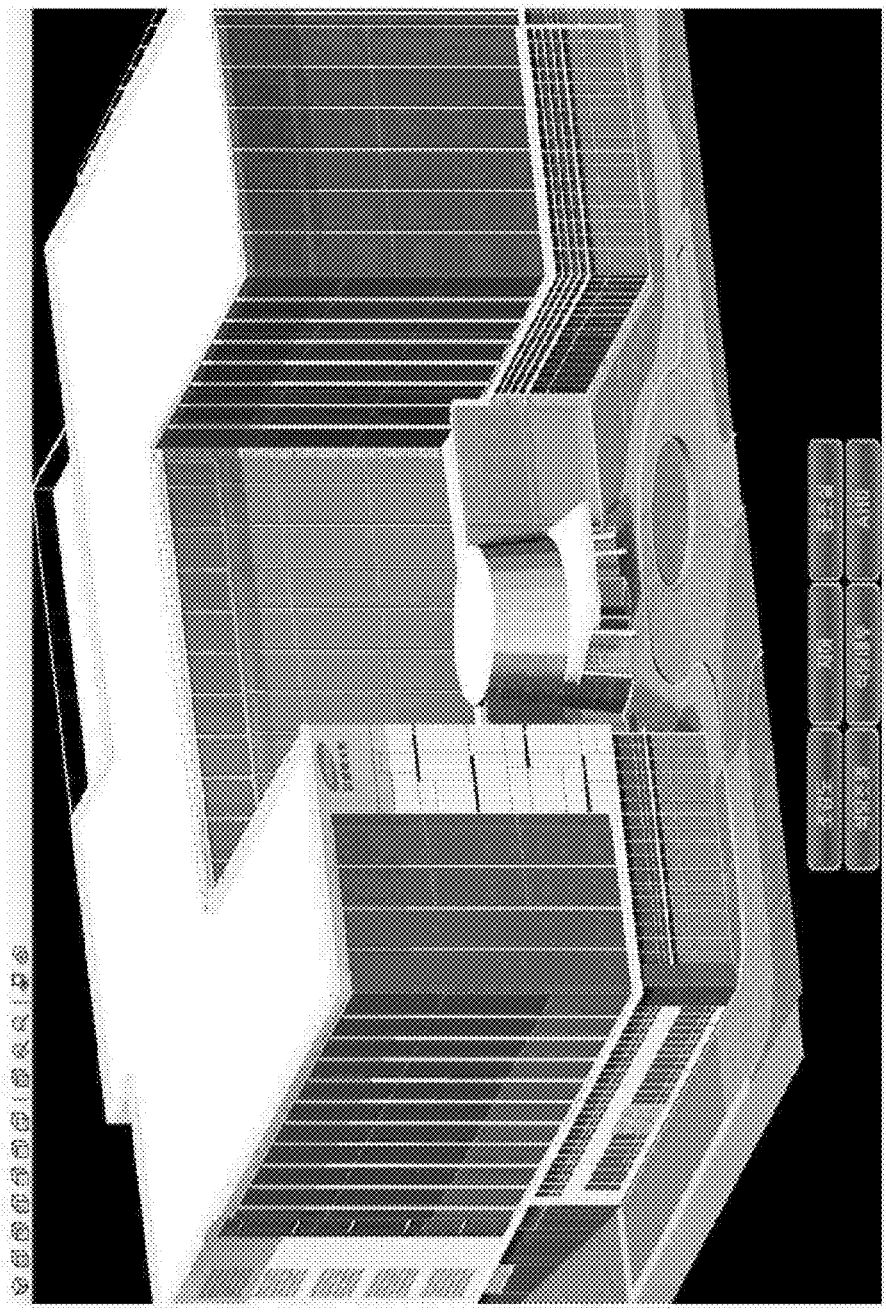
FIG. 21 illustrates that a viewer of a 3D information providing device displays temperatures different in each floor of a building, according to an exemplary embodiment.

FIG. 21 illustrates that a viewer of a 3D information providing device 600 displays temperatures different in each floor of a building, according to an exemplary embodiment.

At least one of the above exemplary embodiments can also be implemented through computer readable code/instructions in/on a medium, e.g., a computer readable medium, to control at least one processing element to implement any above described embodiment. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion. The units represented by a block as illustrated in FIG. 6 may be embodied as the various numbers of hardware, software and/or firmware structures that execute respective functions described above, according to exemplary embodiments. For example, these units may use a direct circuit structure, such as a memory, processing, logic, a look-up table, etc. that may execute the respective functions through controls of one or more microprocessors or other control apparatuses. Also, at least one of these units may further include a processor such as a central processing unit (CPU) that performs the respective functions, a microprocessor, or the like.

It should be understood that the exemplary embodiments described above should be considered in a descriptive sense only and not for purposes of limitation. Descriptions of features or aspects within each embodiment should typically be considered as available for other similar features or aspects in other embodiments.

While one or more embodiments of the inventive concept have been described with reference to the drawings, it will be understood by those of ordinary skill in the art that various changes in form and details may be made therein without departing from the spirit and scope of the inventive concept as defined by the following claims.

What is claimed is:

1. A three-dimensional (3D) information providing device comprising:
    at least one processor; and
    a computer-readable storage medium storing instructions which, when executed by the at least one processor, cause the at least one processor to perform operations comprising:
        generating a 3D graphic screen that allows a user to drag and drop at least one 3D device image among a plurality of 3D device images displayed in a 3D device list,
        binding at least one control point to the 3D device image on the 3D graphic screen, the at least one control point being represented as a user-interactive icon on the 3D graphic screen,
        receiving data collected from at least one sensor provided in at least one monitoring target object corresponding to the 3D device image,
        generating, via the 3D device image, a control signal for controlling the at least one monitoring target object, and
        providing an image editing function for at least one of rotation, magnification, reduction, size-adjustment, 3D translation of the 3D device image on the 3D graphic screen and storing an edited viewpoint of the 3D device image according to the image editing function,
    wherein the operations further comprise generating, on the 3D graphic screen, list information about the at least one control point, link information between the data collected from the at least one sensor and the at least one control point corresponding to the at least one sensor, and information about a 3D device corresponding to the 3D device image.

2. The 3D information providing device of claim 1, wherein the receiving the data comprises receiving the data through a representational state transfer (RESTful) communication method.

3. The 3D information providing device of claim 1, wherein the operations further comprise matching the data collected from the at least one sensor with the at least one control point corresponding to the 3D device image, and display the data, on the 3D graphic screen.

4. The 3D information providing device of claim 1, wherein the operations further comprises calculating and providing the data collected by the at least one sensor on the 3D graphic screen.

5. The 3D information providing device of claim 1, wherein the operations further comprise controlling the at least one monitoring target object by outputting the control signal.

6. The 3D information providing device of claim 1, wherein the operations further comprise receiving the 3D device image from a server which stores and manages 3D graphic-related data including 3D component files, 3D graphic files, and a camera viewpoint storing files.

7. The 3D information providing device of claim 1, wherein the 3D device image is obtained from building information management (BIM) information obtained by 3D-converting a design drawing complying with Industry Foundation Classes (IFC) standards.

8. The 3D information providing device of claim 1, further comprising a viewer configured to support an interface controlling the at least one control point corresponding to the 3D device image, wherein the at least one monitoring target object is controlled by using at least one of the 3D device image and the at least one control point corresponding to the 3D device image.

9. The 3D information providing device of claim 1, wherein the operations further comprise displaying at least one of a temperature and a temperature change of the at least one monitoring target object by using the 3D device image corresponding to the at least one monitoring target object.

10. The 3D information providing device of claim 1, wherein, with respect to different attributes of the 3D device, the at least one control point comprises a plurality of control points bound to the 3D device image according to the different attributes of the 3D device, the plurality of control points being represented in a plurality of user-interactive icons.

11. A three-dimensional (3D) information providing device comprising:
    at least one processor; and
    a computer-readable storage medium storing instructions which, when executed by the at least one processor, cause the at least one processor to perform operations comprising:
        receiving a value of at least one sensor provided for equipment in a premise,
        displaying a 3D device image of the equipment, at least one control point corresponding to the 3D device image, and the received value on a 3D screen, wherein the 3D device image of the equipment is displayed in a 3D device list comprising a plurality of 3D device images, the at least one control point being represented as a user-interactive icon on the 3D screen,
        providing an image editing function for at least one of rotation, magnification, reduction, size-adjustment, 3D translation of the 3D device image on the 3D screen and storing an edited viewpoint of the 3D device image according to the image editing function, and
        generating a control signal for controlling the equipment, and control the equipment via the control signal through the 3D device image,
    wherein the operations further comprise generating, on the 3D screen, list information about the at least one control point, link information between the data collected from the at least one sensor and the at least one control point corresponding to the at least one sensor, and information about a 3D device corresponding to the 3D device image.

12. The device of claim 11, wherein the operations further comprise receiving the value of at least one sensor through a representational state transfer (RESTful) communication method.

13. A three-dimensional (3D) information providing method comprising:
    obtaining at least one 3D device image;

generating a 3D graphic monitoring screen at a 3D information providing device, the 3D graphic screen allowing a user to drag and drop the 3D device image among a plurality of 3D device images displayed in a 3D device list;

binding at least one control point corresponding to the 3D device image on the 3D graphic monitoring screen, the at least one control point being represented as a user-interactive icon on the 3D graphic monitoring screen;

receiving and displaying, on the 3D graphic monitoring screen, data collected from at least one sensor provided in at least one monitoring target object corresponding to the 3D device image;

generating, via the 3D device image, a control signal for controlling the at least one monitoring target object;

providing an image editing function for at least one of rotation, magnification, reduction, size-adjustment, 3D translation of the 3D device image on the 3D graphic monitoring screen and storing an edited viewpoint of the 3D device image according to the image editing function; and generating, on the 3D graphic screen, list information about the at least one control point, link information between the data collected from the at least one sensor and the at least one control point corresponding to the at least one sensor, and information about a 3D device corresponding to the 3D device image.

14. The 3D information providing method of claim 13, further comprising 3D-converting a design drawing complying with Industry Foundation Classes (IFC) to obtain building information management (BIM) information from which the 3D device image is obtained.

15. The 3D information providing method of claim 13, further comprising displaying at least one of a temperature and a temperature change of the at least one monitoring target object by using the 3D device image corresponding to the at least one monitoring target object.

16. The 3D information providing method of claim 13, further comprising:
matching the received data with the at least one control point corresponding to the 3D device image; and
displaying the data on the 3D graphic monitoring screen.

17. The 3D information providing method of claim 13, wherein remotely calculating the data collected from the at least one sensor and displaying the calculated data on a viewer generated at the 3D information providing device.

* * * * *